United States Patent [19]
Sbaschnigg et al.

[11] Patent Number: 4,938,038
[45] Date of Patent: Jul. 3, 1990

[54] MATERIAL PROCESSING SYSTEM

[75] Inventors: Johann Sbaschnigg; Franz Resch, both of Graz, Austria

[73] Assignee: Maschinenfabrik Andritz Actiengesellschaft, Graz, Austria

[21] Appl. No.: 199,238
[22] PCT Filed: Sep. 16, 1987
[86] PCT No.: PCT/AT87/00054
 § 371 Date: Jul. 13, 1988
 § 102(e) Date: Jul. 13, 1988
[87] PCT Pub. No.: WO88/02046
 PCT Pub. Date: Mar. 24, 1988

[30] Foreign Application Priority Data
 Sep. 17, 1986 [AT] Austria ................... 2489/86

[51] Int. Cl.⁵ .............................. D06B 5/02
[52] U.S. Cl. ............................. 68/9; 68/44; 68/158; 68/181 R
[58] Field of Search ............... 8/156; 68/9, 22 R, 27, 68/62, 44, 158, 181 R

[56] References Cited
U.S. PATENT DOCUMENTS

| | | | |
|---|---|---|---|
| 1,794,039 | 2/1931 | Silvano et al. | 68/9 X |
| 4,004,879 | 1/1977 | Meier-Windhorst et al. | 68/181 R X |
| 4,151,093 | 4/1979 | Krofta | 210/386 |
| 4,246,669 | 1/1981 | Davis | 68/181 R X |

FOREIGN PATENT DOCUMENTS

| | | |
|---|---|---|
| 1964950 | 7/1971 | Fed. Rep. of Germany . |
| 2518770 | 11/1976 | Fed. Rep. of Germany .... 68/181 R |
| 3010260 | 9/1981 | Fed. Rep. of Germany . |
| 03795 | 7/1986 | PCT Int'l Appl. . |
| 149438 | 11/1931 | Switzerland ................ 68/9 |
| 2166660 | 5/1986 | United Kingdom . |

Primary Examiner—Philip R. Coe
Attorney, Agent, or Firm—Townsend and Townsend

[57] ABSTRACT

The invention relates to a device for the treatment of a material, in particular a web or material or pulp, which is made to pass between at least two endless, permeable belts, for instance screen belts or the like conveying means, in particular for the displacement washing of a filter cake or for washing fibrous matter, the material being made to pass between the belts along containers serving for the introduction or discharge of a treatment medium, for instance a wash liquid. The main object is to save energy and surface space requirement in the washing of filter cakes or the like, to reduce the production expenditure for such treatment devices and to increase the washing effect. This is achieved according to the invention by providing, in particular for a gravity countercurrent treatment, conveniently a gravity displacement washing, for the treatment containers to be superimposed, in particular approximately vertically, and for the belts with the material lodged therebetween being made to pass ascendingly around the and between the treatment containers in a loopshaped or undulating path, the material being conveyed by the belts first to the lowermost treatment container and the treatment liquid, for instance fresh water, first being fed to the topmost container, conveniently under pressure, and the treatment containers provided on the side facing the upper side of the belts or the material, in particular on the underside of the containers, with openings for feeding or conveying of the treatment liquid to the belts or the material or to other treatment containers positioned underneath.

16 Claims, 2 Drawing Sheets

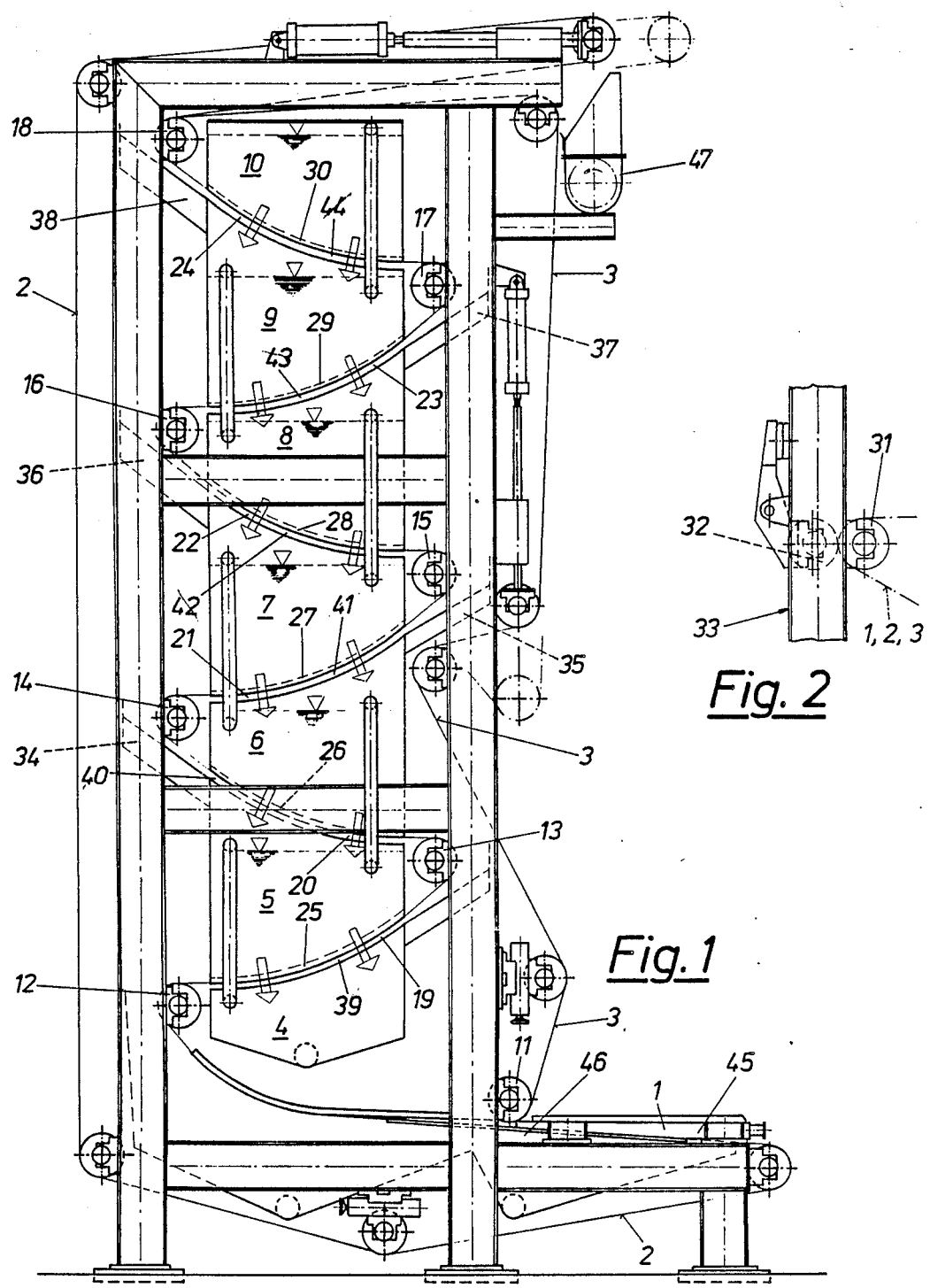

MATERIAL PROCESSING SYSTEM

The invention relates to a device for the treatment of a material, in particular a web of material or pulp, which is made to pass, between at least two endless, permeable belts, for instance screen belts or the like conveying means, in particular for the displacement washing of a filter cake or for washing fibrous matter, the material being made to pass between the belts, conveniently after passing a pressure zone, advantageously a wedge zone, along containers serving for the introduction or discharge of a treatment medium, for instance a wash liquid, a bleaching agent or other chemicals, whereupon the material is optically conveyed to a pressing zone and said containers optically being arranged in series one behind the other and advantageously being connected to inlet or outlets for various treatment media, for instance water and/or bleaching chemicals, optionally of various parameters or values of state, for instance various concentrations or various pressures. The known screen belt presses, in particular double screen belt passes, normally have a considerable surface space requirement. Their energy consumption is also relatively high, particularly if vacuum treatment boxes are provided along the screen belts.

The disadvantages indicated above are eliminated according to the invention by providing, in particular for a gravity countercurrent treatment, conveniently a gravity displacement washing, for the treatment containers to be superimposed, in particular approximately vertically, and for the belts with the material lodged therebetween being made to pass ascendingly around the and between the treatment containers in a loop-shaped or undulating path, the material being conveyed by the belts first to the lowermost treatment container and the treatment liquid, e.g. fresh water, first being fed to the topmost container, conveniently under presssure, and the treatment containers provided on the side facing the upper side of the belts or the material, in particular on the underside of the containers, with openings for feeding or conveying of the treatment liquid to the belts or to the material or to other treatment containers positioned underneath. The embodiment according to the invention has the advantage that by using the force of gravity for the displacement washing or the like, the energy requirement is particularly low and the plant is greatly simplified by the elmination of additional equipment such as pumps and control means; by arranging the treatment containers in a superimposed way, the surface space requirement of the plant is kept particularly low. Added to this is a high degree of coverage of up to more than 98 percent, a low dilution factor of for instance less than a maximum of 1 and, above all, low foaming.

By arranging the treatment containers preferably vertically superimposed, they are conveniently open or provided with openings on the side facing the underside of the belts or the material, in particular on top or in the upper area, for discharging or conveying the treatment liquid. For reducing the surface area requirement, the treatment containers are combined with particular advantage into a container tower, with passages for the belts and the material lodged therebetween provided between superimposed containers. The undersides of the treatment containers or the said passages can be curved convexly or concavely, the adjacent container walls constituting a guide for the belts.

According to a further embodiment of the invention, a particularly effective washing, scrubbing or the like is obtained if optionally driven guide rolls, press rolls, press nips or the like are arranged laterally of the treatment containers or the container tower, the belts with the material being made to pass around them or in them, the belts possibly being connected to the preceding or following treatment container in relation to the moving direction of the belts or the material. Advantageously, the material, in particular a filter cake or the fibrous matter to be washed, is first introduced into the passage between the lowermost container and the next higher container by means of the belts, conveniently over guide rolls, optionally through press nips, and is subsequently passed ascendingly in loops or the like. By the repeated deflection thus obtained, a particular pressing effect is achieved, the total effectiveness of the washing or scrubbing process is increased and the fresh water consumption is reduced. Press nips and S-shaped screen belts guide paths over approximately arranged rolls can further increase such effects.

A practical embodiment can be characterized in that the topmost treatment container is formed as a pressure shoe with a perforated bottom curved downwards to the belts passed therealong and the material lodged therebetween, in which container the treatment liquid, due to the height of this topmost container, is under static pressure or, by connection to a pump, under superpressure. At least a portion of the bottoms of the treatment containers can be curved ascendingly from bottom to top following the respectively adjacent part of the ascending belt or material loop, in particular parallel thereto. In connection with the treatment liquid arriving or flowing onto the belts and the material under more or less pressure, the friction of the belts on the underside of the containers is considerably reduced in this way. The curvature can be asymmetrical, but also symmetrical in relation to the central axis of the container.

Particularly if the superimposed treatment containers are staggered (offset) in relation to one another, optically driven, guide rolls are provided for conveying the belts and the material from the respective lower container to the respective higher container in order to assure proper guidance of the belts. In such cases, but also in the case of vertically superimposed containers, lateral collecting vats or the like connected to the respective container are provided with particular advantage underneath the guide rolls, press rolls, press nips or the like and attached to the, for instance offset, treatment container arranged underneath.

The endless, permeable belts are for instance perforated steel belts or screen belts made of plastic material whose ends are connected in a suitable manner, for instance by welding, weaving or inserting.

The arrangment according to the invention results in an essentially improved and essentially better controllable treatment of the material by means of the treatment medium. The result is a better utilization of the respective treatment medium and thus the possibility of an essentially more compact layout of the plant, e.g. a treatment module of a common device.

A further result is the essentially reduced friction of the belts on the flanges and bottoms of the treatment containers.

The invention is explained by means of two exemplary embodiments under reference to the accompanying drawing.

FIG. 1 shows a tower-like double screen scrubber in lateral view,

FIGS. 2 and 3 are detailed views of modified embodiments.

Figure 3:
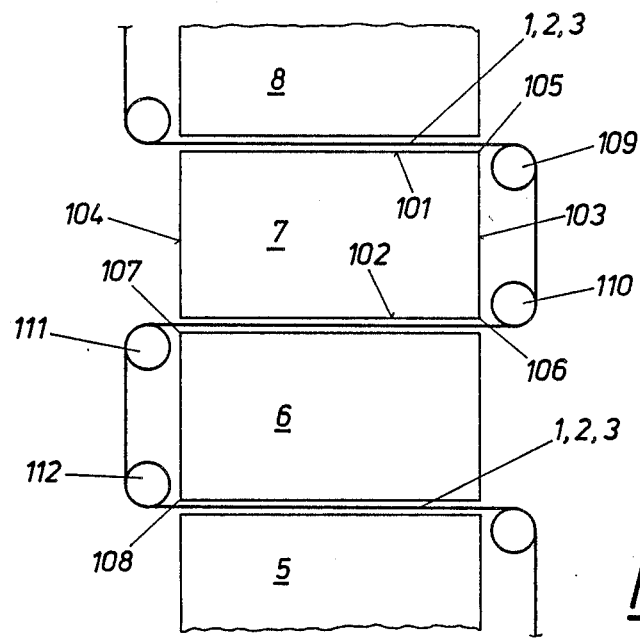

The material 1, in particular a pulp cake, is introduced between the belts 2 and 3 and passed ascendingly in loops or undulations from bottom to top. These loops are passed ascendingly around the and between the treatment container(s) 4 to 10. For this purpose, guide rolls 11 to 18 are provided and passages 19 to 24 are kept free between the containers, with the belts 2,3 and the material 1 lodged therebetween sliding or made to pass, in particular for further guidance, along the undersides 25 to 30 of the containers 5 to 10. By the washing liquid or other treatment media passed under more or less pressure through these bottoms provided with openings to the belts and the material, the belts and the material are slightly pressed away from these bottoms or at least the friction between bottoms and screen belts is reduced.

Under use of gravity, the wash is passed through the material 1 in the countercurrent process by damming up in wash boxes 5 to 10, an additional washing effect being obtained in the deflection zones (rolls 13 to 18) by squeezing the material 1.

As evident from the detail in FIG. 2, press nips 31, 32 could be used instead of the guide rolls 12 to 18 or pressure rolls, although not all the rolls 12 to 18 need by replaced by press nips or the like.

Advantageously, the wash water is passed under pressure through the containers 5 to 10 arranged in the individual loops and formed as washing shoes in this case. It should be mentioned that chemicals, such as for bleaching, can be used instead of the wash water. The pressure mentioned can be applied as static pressure, for instance by making the container 10 of appropriate height (in particular exceeding the height shown), and by taking care, in particular during operation, that the container is nearly completely filled with the treatment medium, for instance water.

In this case, the treatment containers are vertically superimposed. But they can also be staggered or offset in relation to one another in a horizontal direction, additional guide rolls possibly being required in this case.

A special stand 33 permits the tower-like construction of this embodiment. The water and other treatment liquid flowing off the deflection or press rolls 11 to 18 and the press nips 31, 32 is collected by means of collecting vats 34 to 38 or the like connected to the respective, for instance offset, container positioned underneath to which they are laterally attached. The treatment liquid thus flows back into the containers 5 to 9. The containers 4 to 9 are completely open on top in this case, while the container bottoms 25 to 30 can be partially closed, in particular provided with openings in the otherwise closed bottom in order to obtain a damming effect of the treatment liquid. This is particularly important if special pressure is to be exerted on the belts, for instance by connecting the belt 10 to a pressure pump or by providing it with increased height in comparison to the height shown in FIG. 1.

It is evident that the passages 39 to 44 provided between the containers and ascending in moving direction and the bottoms 25 to 30 of the containers 5 to 10 are curved downwards or concave, the adjacent container walls possibly serving as guides for the belts.

It is further evident that the material, in particular a filter cake or the fibrous matter to be washed, is first made to pass, by means of the belts 2,3, conveniently over guide rolls 11, 12, optically through press nips, into the passage 39 between the lowermost container 4 and the next higher container 5 and subsequently in loops or the like further upwards. It is evident that the topmost container 10 is formed as a pressure shoe with a perforated bottom 30 curved downwards to the belts 2,3 passed therealong and the material 1 lodged therebetween, in which container the treatment liquid, as a result of the increased height of this topmost container, is under static pressure or, by means of connection to a pump, under superpressure. As represented, at least a part of the treatment container bottoms 25 to 30 is curved ascendingly from bottom to top following the respective adjacent portion of the ascending belt or material loop, in particular curved parallel in relation thereto. But in special cases, it is conceivable to form at least part of the treatment container bottoms curved symmetrically in relation to the central axis of the containers.

The material 1 to be washed is introduced below at 45 and passed to the washing means via a wedge zone 46. After passing the washing means, the treated material, in particular the washed pulp, is discharged from the space between the belts 2,3 into the collecting vat 47.

The guide rolls or the press nips are conveniently at least partially driven, in order to distribute or reduce the traction on the belts.

FIG. 3 shows a detail of a further embodiment according to the invention. The lateral walls of treatment containers 5 to 10 are quadrangular, in particular approximately rectangular, with approximately plane upper boundary 101 and/or lower boundary 102 as well as vertical lateral boundaries 103, 104. On the sides of the treatment containers or of the container tower, optionally driven guide rolls, press rolls, press nips or the like are provided, namely, at least two such rolls or the like 109, 110 or 111, 112 for each treatment container in the area of its vertical lateral boundaries or walls 103 or 104 at the rectangle corners 105, 106 or 107, 108. The advantage of such embodiments is a.o. that the containers can take up a comparatively large amount of treatment liquid. Lateral walls of different quadrangular shape, for instance trapeze shape, in connection with two or more rolls or the like at the vertical boundaries in guestion, are conceivable and of advantage for selected cases of application, for instance for the reduction of the construction height.

In summarizing, the following is to be emphasized: In the vertical double screen machine according to the invention, a material predehydrated to about 10 to 40, in particular about 12 percent, is passed upwards in one or several loops and the wash water is made to pass through the material downwards in countercurrent through open wash boxes. The deflection results in a squeezing effect increasing the total effectiveness of the washing operation and reducing the use of fresh water (diluting factor!). The deflection zones can also be formed with several S-shaped rolls or, as mentioned above, with one or more press nips (FIG. 2!)

The main advantage of this embodiment according to the invention resides mainly in that fact that by relying on the force of gravity for the displacement washing, the energy requirement is very low and the plant is of very simple construction due to the elimination of additional equipment such as pumps and control means.

We claim:

1. A device for the treatment of a material comprising:
 a plurality of stationary containers for receipt of a treatment medium, said plurality of containers being superimposed and including a lowermost treatment container and an uppermost treatment container, said containers including means for introducing and discharging the treatment medium, the treatment medium being first fed to the uppermost treatment container;
 at least two endless permeable belts for guiding the material therebetween, said belts having an undulating path including a plurality of loops extending about a portion of the underside of the containers;
 means for transporting said belts with the material lodged therebetween ascendingly around the treatment containers in the path of the belts, said means for transporting conveying the material with the belts first to the lowermost treatment containers;
 a single container being disposed within each single loop of the belts; and
 a guide for the belts and thus the material, said guide being formed by the underside of the containers, said guide facing an upper side of the belts, the undersides having an opening formed therein for feeding the treatment medium to the belts and to the further treatment containers positioned beneath the container, the walls of the further containers having upper borders, said guide being additionally formed by said upper borders.

2. The device according to claim 1 wherein the treatment containers have an open top.

3. The device according to claim 2, further comprising a container tower comprising said treatment containers including passages disposed directly between the underside and the top of the superimposed containers for receiving said belts and the material lodged therebetween.

4. The device according to claim 3 wherein the walls of the further containers have upper borders, the undersides are convex and the upper borders are concave such that said guide is curved upwardly and the adjacent container walls comprise a guide for the belts.

5. The device according to claim 1 further comprising rolls arranged laterally of the treatment containers, said belts with the material therebetween being guided around said rolls.

6. The device according to claim 5 further comprising a lateral collecting vat connected to each treatment container beneath said roll and attached beneath the treatment container.

7. The device according to claim 1 further comprising a collecting container under the lowermost treatment container, a passage between said collecting container and the treatment container immediately thereabove, means including the belts for introducing the material into said passage and further ascendingly in loops around the treatment containers positioned thereabove.

8. The device according to claim 1 wherein the uppermost container comprises a pressure shoe having a perforated bottom curved downwardly such that the belts pass therealong having the material lodged therebetween, the treatment liquid in the uppermost container being under pressure due to the height of said uppermost container.

9. The device according to claim 1 wherein at least a portion of the underside of the treatment containers is curved ascendingly from bottom to top following the adjacent part of the respective ascending loop.

10. The device according to claim 1 wherein the treatment container includes a central axis and wherein at least a portion of the undersides of the treatment containers is curved symmetrically in relation to said central axis of the containers.

11. The device according to claim 1 wherein said superimposed treatment containers are offset or staggered in relation to each other to thereby at least partially guide the belts.

12. The device according to claim 1 wherein the treatment containers include lateral walls having a concavely curved upper boundary, a convexly curved lower boundary, and vertical lateral boundaries, said lateral walls being approximately trapeze-shaped.

13. The device according to claim 12 wherein said lateral walls are approximately rectangular having generally rectangular corners and substantially planar upper, lower and vertical lateral boundaries, and further comprising rolls disposed laterally of the treatment containers adjacent the vertical lateral boundaries at the rectangular corners.

14. A device for washing fibrous material comprising:
 a plurality of stationary containers for receipt of a treatment medium, said containers being vertically aligned and connected in series one behind the other, said plurality of containers including a lowermost treatment container and an uppermost treatment container, said containers including means for introducing and discharging the treatment medium for a gravity displacement washing, fresh treatment medium being first fed to the uppermost treatment container;
 at least two endless screen belts for guiding the material around the treatment containers, said belts having an undulating path including a plurality of loops extending about a portion of the underside of the containers;
 a wedge zone for directing the material between the belts;
 means for transporting said belts with the material lodged therebetween ascendingly around the treatment containers in the path of the belts, said means for transporting conveying the material with the belts first to the lowermost treatment container;
 a single container being disposed within each single loop of the belts; and
 a guide for the belts and thus the material, said guide being formed by the underside of the containers, said guide facing an upper side of the belts, the undersides having an opening formed therein for feeding the treatment medium to the belts and to the further treatment containers positioned vertically beneath the container, the walls of the further containers having upper borders, said guide being additionally formed by said upper borders.

15. The device according to claim 14 wherein the treatment containers have an open top.

16. The device according to claim 14, further comprising a container tower comprising said treatment containers including passages disposed directly between the underside and the top of the superimposed containers for receiving said belts and the material lodged therebetween.

* * * * *